United States Patent Office 3,582,409
Patented June 1, 1971

3,582,409
METHOD OF PRODUCING POTASSIUM SILICATE GLASS COATING FOR FERROUS MAGNETIC SHEET STOCK
Dale M. Kohler, Middletown, Ohio, assignor to Armco Steel Corporation, Middletown, Ohio
No Drawing. Original application Jan. 2, 1968, Ser. No. 694,882, now Patent No. 3,522,113, dated July 28, 1970. Divided and this application Feb. 18, 1970, Ser. No. 12,471
Int. Cl. H01f 1/18
U.S. Cl. 148—111
12 Claims

ABSTRACT OF THE DISCLOSURE

Methods of making potassium silicate glass coatings for silicon steel magnetic sheet stock, wherein the sheet stock, having on its surfaces a film comprising a mill glass layer, or phosphate coating layer, or layers of both, is coated with an aqueous solution of potassium silicate having a silica to potassium oxide ratio of from about 2:1 to about 2.5:1 and higher. The coated stock, in strip form, is then heated rapidly to a temperature of from about 1000° F. to about 1650° F., whereby to form on the stock a smooth, heat-resistant, protective, insulative glass having a total final thickness of from .04 mil to about .2 mil, and whereby to improve the magnetic properties of the stock.

CROSS REFERENCE TO RELATED APPLICATIONS

This is a division of United States patent application Ser. No. 694,882, filed Jan. 2, 1968 and now Pat. No. 3,522,113, in the name of Dale M. Kohler and entitled "Potassium Silicate Coated Silicon Steel Article."

BACKGROUND OF THE INVENTION

(1) Field of invention

The invention relates to a protective and insulative coating for silicon steel magnetic sheet stock, and more particularly to an adherent potassium silicate glass coating or film for sheet gauge oriented and non-oriented silicon steels already haing a mill glass, or an applied coating or glass, or both, on their surfaces. The invention further relates to methods of forming the potassium silicate glass on the stock to produce a final product having improved magnetic properties and a glass coating exhibiting superior insulative qualities and oxidation resistance.

The term "silicon steel" as used herein is intended to include both oriented and non-oriented silicon steels, and relates to materials containing about .5% to about 5% silicon, an initial carbon content of not more than about .040%, an initial sulfur (or selenium) content of not more than about .03%, manganese in the range of about .02% to about .4%, and an aluminum content of not more than about .40%, the balance being iron with phosphorus, copper and such other impurities as are usual in the manufacture of silicon steel in the basic open hearth furnace, electric furnace or the various oxygen blowing processes.

(2) Description of the prior art

Various processes for producing silicon steel sheet stock for magnetic uses are well known in the art. The initial melt composition, the nature and sequence of the processing steps, and other processing factors will depend upon the desired nature and properties of the final product. For example, processes for producing silicon steel include the steps of hot reducing the silicon steel, removing scale, cold rolling to final gauge and subjecting the stock to a final anneal. Usually the routing includes a decarburizing anneal as well.

In many uses of oriented and non-oriented silicon steels, the need for a glass-type insulative coating or film on the surfaces of the stock has been widely recognized. Such glass coatings or films on the sheet stock are important in the manufacture for magnetic apparatus, and the like.

Heretofore, there have been a number of approaches to the formation of a glass or coating on the sheet stock. In the 1930's sodium silicate and various additives were proposed for use as resistive coatings and to prevent rust. Work along these lines has continued as evidenced by U.S. Letters Pat. No. 3,301,702 wherein a coating for protecting ferrous base alloys from oxide scaling or decarburization at elevated temperatures is taught, comprising an alkali metal silicate and aluminum oxide.

In the 1940's and after, attention was turned to phosphate coatings for interlamination resistivity and protection against rust and corrosion. For example, U.S. Letters Pat. No. 2,501,846 to Gifford teaches the application of insulative phosphate coatings to ferrous magnetic sheets. Such coatings have become of particular importance in the manufacture of oriented silicon-irons which have orientations achieved through the surface energy phenomenon and which cannot tolerate a glass coating during the final high temperature anneal. In such instances phosphate coatings may be applied after the high temperature final anneal.

At the same time, prior art workers investigated glass coatings, formed on silicon steel stock as a part of the mill routing, in instances where the provision of such coatings did not interfere with the achievement of the desired magnetic characteristics of the final product. Such glass coatings are commonly referred to as "mill glasss" and may be further defined in light of this invention as any glass coatings formed by the reaction of magnesium or calcium compounds with silica derived at least in part from the oxidation of silicon in the silicon steel base. The "mill glass" may contain additional inert or reactive ingredients.

Silicon steels having orientations achieved through the grain boundary energy phenomenon are examples of ferrous materials upon which mill glass may be formed. The mill glass is formed during the high temperature final anneal. An annealing separator such as magnesia is used, which reacts with silicon from the steel (in the form of silica) to produce a glass film, substantially magnesium silicate, on the steel surfaces. The formation of such a glass is taught in U.S. Letters Pat. No. 2,385,332 to Carpenter et al. and U.S. Letters Pat. Nos. 3,333,991; 3,333,992 and 3,333,993, in the name of the present inventor. The above mentioned patents teach the formation of a surface silica layer, generally during a decarburization step prior to the final anneal.

As disclosed in U.S. Letters Pat. No. 2,354,123 to Horstman et al., a magnesia annealing separator containing silica additions may be used as an annealing separator on preoxidized silicon-iron sheet stock. In U.S. Letters Pat. No. 2,394,047 to Elsey et al. it is taught that an oxidizing agent such as calcium hydroxide or a metallic carbonate or hydroxide may be added to a magnesia annealing separator containing silica, thus eliminating the necessity of preoxidizing the silicon steel. These patents represent various approaches to the formation of mill glass on the surfaces of ferrous magnetic materials.

Silicon steels provided with glass films or coatings of the types described above have been found under normal circumstances to possess sufficient insulative qualities.

However, silicon steels so coated have also been found capable of being severely damaged magnetically by anneals subsequent to the final anneal (such as stress relief anneals) practiced by manufacturers of transformers and the like. Often such anneals are conducted in atmospheres and under operating conditions conducive to oxidation and carbon pick-up. In addition, mill glass is not always characterized by uniform thickness, and may have thin spots. Products having been subjected to such subsequent anneals frequently demonstrate the presence of oxide scale and internal oxidation of silicon just below the surface. In addition, carbon pick-up often occurs, resulting in increased watt loss and further deterioration of the magnetic properties (known in the art as magnetic aging).

Phosphate coatings, on the other hand, are easily reduced by certain reducing atmospheres. When this occurs free phosphorus is formed which contaminates the steel, and metallic iron is formed which breaks down the interlamination resistivity of the coating. It will be understood that the term "phosphate coatings" as used herein includes coatings of phosphoric acid with or without metal phosphates, such as magnesium phosphate and aluminum phosphate, as well as other agents added for specific purposes.

Until relatively recently magnetic losses due to stress relief anneals or the like were not considered to be of as great concern as they are today, because product requirements were not as high. In addition, the magnetostriction effect was not a primary concern and the noise factor in transformers and the like was not looked upon as being of great importance. In recent years however, product requirements have risen considerably, and the need for a glass coating, having not only sufficient insulative qualities but also sufficient protective qualities to preserve and even enhance the magnetic properties of silicon steels, has become acute.

It has been discovered that the above mentioned problems may be overcome by the application of a potassium silicate glass film to silicon steels having a mill glass, or an applied coating, or both, on their surfaces. The potassium silicate glass coatings of the present invention are characterized by adequate refractoriness and an attractive surface appearance. The glass coatings of the present invention provide additional electrical resistivity, increase the tensional level in the ferrous magnetic material to which it is applied (thus improving magnetostriction), and protect the ferrous magnetic material against contamination or magnetic deterioration caused by subsequent anneals such as stress relief aneals. These benefits are obtained inexpensively, since the invention may be practiced with existing plant equipment and readily available chemical compounds. Furthermore, the applied coating of potassium silicate does not depend upon a chemical reaction with the ferrous substrate nor with previously formed coatings.

SUMMARY OF THE INVENTION

In accordance with the present invention oriented and non-oriented silicon steels are provided with a potassium silicate glass coating or film. Once the silicon steel magnetic stock has been processed to final gauge, imparted with the desired metallurgical characteristics, and provided with a mill glass, or applied coating such as a phosphate coating, or both, it is coated with an aqueous solution of potassium silicate (with silica to potassium oxide ratios taught below. The coated stock may then be strip annealed at a temperature of from about 1000° F. to about 1650° F. in air or a protective atmosphere to form a tenacious, insulative and protective glass film on the stock. The coating and annealing steps may constitute separate processing steps in the production of the final product. It is within the scope of the invention, however, to coat the stock with the aqueous solution of potassium silicate and to fire the coating to form a glass as a part of a thermal-flattening anneal. It is also within the scope of the invention to practice the coating and firing steps after thermal-flattening.

As is known in the art, the potassium silicate solutions of the present invention may contain small amounts of stabilizers to form glass films characterized by increased refractoriness and increased resistance to chemical attack.

DESCRIPTION OF THE PREFERRED EMBODIMENTS

The potassium silicate glass coatings or films of the present invention comprise applied coatings, formed on silicon steel after the stock has been processed to final gauge and imparted with the desired metallurgical characteristics. As indicated above, the potassium silicate glass is formed on silicon steel stock already having on its surfaces a mill glass or an applied glass or coating such as a phosphate coating, or both. The potassium silicate coating displays excellent adherence, limited only by the basic adherence of the underlying coating or glass.

It has been discovered that potassium silicate is an especially desirable coating for silicon steels because it can be applied in a solution that is easy to use; it can be applied at room temperature; it can be fired at temperatures of from 1000° F. to 1650° F. into a glass of adequate refractoriness without boiling; and it produces a tenacious, very smooth glass of attractive appearance. The potassium silicate glass so formed has a coefficient of expansion less than steel, resulting in residual tension in the silicon steel with corresponding improvement in magnetostriction and core loss. The glass also has excellent electrical resistivity.

In the practice of this invention potassium silicates having a silica to potassium oxide ratio of from about 2:1 to about 2.5:1 and higher are preferred. Potassium silicates of a highly siliceous composition are preferred since they form glassy coatings with a high degree of refractoriness. Kasil #1, sold by the Philadelphia Quartz Company, and Du Pont Grade No. 30, sold by E. I. Du Pont de Nemours and Company, are examples of potassium silicates found suitable for the present invention. Both have a weight ratio of silica to potassium oxide of 2.50. Potassium silicates of this type have the special property of producing glasses which do not effloresce or "bloom." Sodium silicates, for example, will "bloom," and as such are unsuitable for the purposes of the present invention.

An aqueous solution of potassium silicate comprises a coating which may be easily applied to the surfaces of silicon steel strip by known means including dipping, spraying, doctoring, roller coating or other methods producing a thin, uniform coating. The coating is applied in a thickness such that, after firing, a glass will be formed having a total final thickness including the underlying mill glass, applied coating or both of from about .04 mil to about .2 mil, and preferably from about .08 mil to about .12 mil.

Potassium silicates are available in liquid or solid form. The amount of dilution is not critical and depends on a number of factors including coating method, temperature of application and the like. For example, when both the solution and the silicon steel strip are at room temperature and application is made by roller coating, excellent results are achieved with a potassium silicate to water ratio of from about 1:0.5 to about 1:6.

The solution may be fired to form a glass rapidly, as is necessary on a commercial production line. Firing is preferably accomplished by a strip anneal in air or in a protective atmosphere such as nitrogen, hydrogen, mixtures thereof, or gases obtained by the partial combustion of natural gas. A glass of excellent quality is formed when the potassium silicate solution is fired at a temperature of from about 1000° F. to about 1650° F. and preferably of from about 1200° F. to about 1500° F. Unless the coating is fired at a temperature of at least 1000° F., front and back portions of the coil and stress relieved at 1475° F. in a 90% nitrogen—10% hydrogen atmosphere.

Magnetic test results of the stress relieved samples are given in Table IV.

TABLE IV

| Sample condition | Position in coil | Core loss (oersteds) | | | Permeability at H$_{20}$ | Magneto-striction ($\Delta$L/L) | Franklin (amp) |
| --- | --- | --- | --- | --- | --- | --- | --- |
| | | P10:60 | P15:60 | P17:60 | | | |
| Mill glass only | Front | .249 | .554 | .802 | 1,824 | +5 | .67 |
| Silicate coated | do | .234 | .530 | .760 | 1,832 | −75 | .10 |
| Mill glass only | Back | .255 | .561 | .805 | 1,816 | +122 | .65 |
| Silicate coated | do | .239 | .538 | .782 | 1,816 | −56 | .08 |

The consistently lower core losses at each induction and the considerably higher Franklin resistivity (lower amperage) imparted by the potassium silicate glass indicate the excellent protection against oxidation and the superior insulative properties provided by the potassium silicate. In addition, the magneto-striction was again greatly improved.

EXAMPLE IV

A coil of 3% silicon-iron was processed commercially to obtain a cube-on-edge oriented product after the final high temperature box anneal at 2200° F. in dry hydrogen. Magnesia applied to the surfaces prior to the anneal had reacted with silica on the surfaces of the silicon-iron to form a mill glass coating.

The mill glass was cleaned by flash pickling the surface and the strip was coated with magnesium phosphate and thermally-flattened at 1500° F.

The phosphate coated strip was then roller coated at room temperature with a 1:1 water solution of potassium silicate and immediately, while at a speed of fifty feet per minute, fired at a temperature of 1400° F.-1450° F. in an air atmosphere furnace.

Samples from the front and back of the coil were stress relieved at 1500° F. for two hours in a dry 90° nitrogen—10% hydrogen atomsphere, together with adjacent samples taken from the same coil having the mill glass and phosphate coatings and tested for magnetic properties. The test results are given in Table V.

TABLE V

| Coating | Position in coil | Core loss (oersteds) | | | Permeability at H$_{10}$ | Magnetostriction ($\Delta$L/L) |
| --- | --- | --- | --- | --- | --- | --- |
| | | P10:60 | P15:60 | P17:60 | | |
| Double | Front | .236 | .549 | .840 | 1,785 | −85 |
| Triple | do | .241 | .556 | .852 | 1,790 | −111 |
| Double | Back | .242 | .556 | .847 | 1,790 | −76 |
| Triple | do | .240 | .555 | .840 | 1,790 | −108 |

The triple coated coil had a coating thickness of about .02 mil.

Although the core loss values were inconclusive, it is readily apparent that the potassium silicate coating improved the magnetostriction as compared to the same material having only mill glass and phosphate coatings. Due to the basic nature of the potassium silicate, there may have been some chemical reaction with the acid phosphate coating which resulted in no improvement in the core loss values.

Modifications may be made in the invention without departing from the spirit of it. For example, small amounts of soluble stabilizers (well known in the art and comprising compounds of the elements of Groups I-A and II-A of the Periodic Table) may be added to the potassium silicate solutions of the present invention to increase the refractoriness of the potassium silicate glass and render the glass more resistant to chemical attack.

The manner in which the potassium silicate solution and the firing thereof to form a glass are accomplished will depend, in large measure, on the ultimate use to which the silicon steel stock is put. For example, if the stock is to be used in distribution transformers, it is usually subjected to a stress relief anneal. Often, a thermal-flattening anneal is dispensed with when the stock is to be subjected to a stress relief anneal. Under such circumstances, the coating and firing steps in the formation of a potassium silicate glass will usually constitute separate steps in the processing. When the silicon steel is to be used in power transformers, it generally will not be subjected to a stree relief anneal, but it may be subjected to a thermal-flattening anneal. Under such circumstances, the thermal-flattening anneal may serve simultaneously as the firing anneal in the formation of the potassium silicate glass.

The embodiments of the invention in which an exclusive propetry or privilege is claimed are defined as follows:

1. In a process of producing oriented and non-oriented silicon steel stock comprising the steps of hot reducing the silicon steel, removing the scale, cold rolling to final gauge, subjecting said stock to a final anneal and providing the surfaces of said stock with a film chosen from the class consisting of a layer of mill glass, a layer of phosphate coating, and layers of both, the improvement comprising the steps of coating said stock having said surface film with an aqueous solution consisting essentially of potassium silicate and heating said coated stock to a temperature above 1000° F. to form a potassium silicate glass on said stock over said film.

2. The process claimed in claim 1 wherein said potassium silicate has a silica to potassium oxide ratio of from about 2:1 to about 2.5:1 and higher.

3. The process claimed in claim 1 wherein said heating step comprises a strip anneal.

4. The process claimed in claim 1 wherein said heating step is conducted at a temperature of from about 1000° F. to about 1650° F.

5. The process claimed in claim 1 wherein said heating step is conducted at a temperature of from about 1200° F. to about 1500° F.

6. The process claimed in claim 1 wherein said silicon steel stock has on its surfaces a coating having final thickness of from about .04 mil to about .2 mil.

7. The process claimed in claim 1 wherein said silicon steel stock has on its surfaces a coating having a final thickness of from about .08 mil to about .12 mil.

8. The process claimed in claim 1 wherein said heating step is conducted in air.

9. The process claimed in claim 1 wherein said heating step is conducted in a protective atmosphere chosen from the class consisting of hydrogen, nitrogen, mixtures thereof and partially combusted natural gas.

10. The process claimed in claim 1 including the step of flash pickling said stock having said surface film of mill glass prior to said coating of said stock with said potassium silicate solution.

11. The process claimed in claim 1 including the step of subjecting said coated stock to a thermal-flattening anneal, said thermal-flattening anneal comprising said heating step.

12. In a process of producing oriented and non-oriented silicon steel stock comprising the steps of hot reducing the silicon steel, removing the scale, cold rolling to final gauge, subjecting said stock to a final anneal and providing the surfaces of said stock with a film chosen from the class consisting of a layer of mill glass, a layer of phosphate coating, and layers of both, the improvement comprising the steps of coating said stock having said surface film with an aqueous solution comprising potassium silicate, said potassium silicate having a silica the glass does not have sufficient refractoriness, nor does it produce the required tension levels in the steel.

It has been found that the coating becomes progressively more durable and higher tension levels in the silicon steel are achieved after firing when the solution is fired at the upper portion of the above given temperature ranges. It has further been found that these advantages will not be lost when the silicon steel is subjected to a subsequent stress relief anneal.

If the firing step is practiced at temperatures above about 1650° F. the silicon steel demonstrates a greater susceptibility to magnetic damage. At such high temperatures, the strength of the silicon steel is lowered and difficulty is encountered in handling the strip during the firing anneal without imparting too much tension to it.

In normal strip annealing operations, the time at temperature might range from zero to about three minutes. The strip speed will usually be about twenty-five feet per minute or higher depending upon the length of the furnace and other factors such as strip width and thickness, furnace temperature and the like.

The glass coating of the present invention provides excellent protection for the base metal during stress relief annals in harmful atmospheres such as wet atmospheres of any gases or wet or dry atmospheres of exothermic gases. Excellent results are achieved when the potassium silicate glass is applied to the surfaces of silicon steel stock having a layer of mill glass or a phosphate coating thereon, the stock being thereafter subjected to a stress relief anneal in a dry 90% nitrogen, 10% hydrogen atmosphere.

When the potassium silicate glass coating of the present invention is to be applied to silicon steel stock having a mill glass on its surfaces, the mill glass is formed during the final anneal developing the desired grain orientations, as described above. Excess annealing separator is removed by scrubbing or the like, leaving only the mill glass on the stock surfaces. The stock is then preferably (although not necessarily) subjected to a flash pickle prior to the application of the potassium silicate solution.

When the glass of the present invention is to be formed on silicon steel stock having an applied coating, such as a phosphate coating, the annealing separator may be entirely removed or excess magnesia may be scrubbed or pickled from the stock after the final anneal developing the grain orientation. The stock is then provided with an applied coating, as for example in accordance with the teachings of the above mentioned U.S. Pat. No. 2,501,846, and then coated with potassium silicate.

The application of the potassium silicate solution and the firing thereof to form a glass may be accomplished in several ways. For example, the application step and the firing step may constitute separate and additional steps in the production of the stock after the mill glass, or applied coating, or both has been formed thereon, as described above.

On the other hand, in the production of oriented and non-oriented silicon steels, it is often the practice to subject the stock at final gauge (and having the desired metallurgical characteristics) to a thermal-flattening anneal as taught in U.S. Letters Pat. No. 3,130,088 to Cook and U.S. Letters Pat. No. 3,161,225 to Ward et al. Since the thermal-flattening anneals are generally conducted within a temperature range similar to that given above for firing the potassium silicate solution to form a glass, it is within the scope of the present invention to apply the potassium silicate solution prior to a thermal-flattening aneal and to fire the solution during the thermal-flattening anneal.

It is also within the scope of the present invention to practice the coating and firing steps to form the potassium silicate glass after the stock has been subjected to a thermal-flattening treatment.

Examples of the practice of the invention will now be given, it being understood that they are illustrative only, and are not intended as a limitation on the invention.

EXAMPLE I

Samples from a commercial coil of 9 mil, cube-on-edge silicon steel, processed in accordance with the teachings of U.S. Leters Pat. No. 3,333,992, and having a mill glass on its surfaces, were flash pickled, coated with potassium silicate solutions and fired in a laboratory strip furnace in an air atmosphere. Table I indicates the potassium silicate to water ratios of the solutions, type of potassium silicate used and the approximate sample temperature during firing.

TABLE I

| Sample number | Solution (Kasil) | Approximate strip temperature (° F.) |
| --- | --- | --- |
| 1 | 1:1 | 1,500 |
| 2 | 1:1 | 1,350 |
| 3 | 1:1 | 1,000 |
| 4 | 1:2 | 1,350 |
| 5 | 1:2 | 1,000 |

Table II sets forth the magnetic properties of the samples as sheared and after being subjected to a stress relief anneal for two hours at 1500° F. and in a dry atmosphere of 90% nitrogen and 10% hydrogen. Table II includes a sample from the same coil which was not provided with a potassium silicate glass and had only the mill glass on its surfaces.

TABLE II

| Samples | Core loss (oersteds) | | | Permeability at $H_{10}$ | Magnetostriction ($\Delta L/L$) |
| --- | --- | --- | --- | --- | --- |
| | P10:60 | P15:60 | P17:60 | | |
| Mill glass only | .203 | .472 | .710 | 1,822 | −53 |
| 1 | .195 | .460 | .699 | 1,817 | −63 |
| 2 | .193 | .457 | .695 | 1,817 | −65 |
| 3 | .190 | .448 | .677 | 1,820 | −53 |
| 4 | .193 | .453 | .680 | 1,821 | −46 |
| 5 | .207 | .482 | .735 | 1,799 | −40 |

The potassium silicate glass was approximately 0.1 mil thick on all samples. The potassium silicate glass remained smooth and continuous and did not lose resistivity during the stress relief anneal.

EXAMPLE II

Three samples, identical to Samples 1, 2 and 3 of Example I above, and one sample having only mill glass on its surfaces, were subjected to a stress relief anneal for four hours at 1550° F. and in an atmosphere of partially combusted natural gas.

Table III indicates the magnetic properties of the samples after the stress relief anneal.

TABLE III

| Samples | Core loss (oersteds) | | | Permeability at $H_{10}$ | Magnetostriction ($\Delta L/L$) |
| --- | --- | --- | --- | --- | --- |
| | P10:60 | P15:60 | P17:60 | | |
| Mill glass only | .220 | .525 | .795 | 1,810 | 0 |
| 1 | .195 | .470 | .716 | 1,817 | −80 |
| 2 | .200 | .478 | .737 | 1,803 | −73 |
| 3 | .200 | .475 | .721 | 1,818 | −43 |

Again, in spite of the conditions of this stress relief anneal (normally recognized to be harmful to the silicon steel and its magnetic properties), excellent protection was provided by the potassium silicate glass. The magnetic properties were improved including a great improvement in magnetostriction.

EXAMPLE III

A commercial coil of nominally 3% silicon steel, having on its surfaces a conventional mill glass coating, was roller coated with a solution of one part Kasil #1 potassium silicate and two parts of water. The strip traveling at fifty feet per minute was then annealed at 1200° F. in an open furnace adjacent to the coating unit.

A continuous and very smooth coating of potassium silicate about 0.1 mil thick was formed over the mill glass. Test samples of the mill glass coated material before and after the potassium silicate treatment were taken from the to potassium oxide ratio of from about 2:1 to about 2.5:1 and higher, and heating said coated stock to a temperature of from about 1000° F. to about 1650° F. to form a coating having a final thickness of from about .04 mil to about .2 mil.

References Cited

UNITED STATES PATENTS

| | | | |
|---|---|---|---|
| 2,492,095 | 12/1949 | Gifford | 148—110X |
| 2,914,107 | 11/1959 | Gaines, Jr. | 117—169 |
| 2,920,296 | 1/1960 | Neurath | 148—113UX |
| 2,978,361 | 4/1961 | Lam | 117—169 |
| 2,980,561 | 4/1961 | Ford et al. | 148—6.15 |
| 3,418,710 | 12/1968 | Seidel et al. | 117—129 |

L. DEWAYNE RUTLEDGE, Primary Examiner

G. K. WHITE, Assistant Examiner

U.S. Cl. X.R.

148—113